United States Patent
Barreto et al.

(10) Patent No.: US 7,569,103 B2
(45) Date of Patent: Aug. 4, 2009

(54) CONSUMABLE INKS WITH IMPROVED IMAGE PERFORMANCE

(75) Inventors: Marcos A. Barreto, Aguadilla, PR (US); Jorge L. Garcia, Aguadilla, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 248 days.

(21) Appl. No.: 11/297,235

(22) Filed: Dec. 8, 2005

(65) Prior Publication Data

US 2007/0132823 A1    Jun. 14, 2007

(51) Int. Cl.
    C09D 11/02    (2006.01)
    G01D 11/00    (2006.01)
(52) U.S. Cl. .................. 106/31.58; 106/31.86; 347/100
(58) Field of Classification Search ............... 106/31.58, 106/31.86; 347/100
    See application file for complete search history.

(56) References Cited

U.S. PATENT DOCUMENTS

| | | | |
|---|---|---|---|
| 3,258,347 | A | 6/1966 | Carroll |
| 4,548,825 | A | 10/1985 | Voss et al. |
| 5,006,362 | A | 4/1991 | Hilborn |
| 6,776,341 | B1 | 8/2004 | Sullivan et al. |
| 2004/0021757 | A1 | 2/2004 | Shastry et al. |
| 2004/0086603 | A1 | 5/2004 | Shastry et al. |
| 2004/0175463 | A1 | 9/2004 | Shastry |
| 2005/0061184 | A1 | 3/2005 | Russell et al. |
| 2005/0099476 | A1 | 5/2005 | Chinea |
| 2007/0134330 | A1* | 6/2007 | Barreto et al. ............. 424/472 |

FOREIGN PATENT DOCUMENTS

| | | |
|---|---|---|
| JP | 2002212474 | 7/2002 |
| WO | 9829514 | 7/1998 |
| WO | 9948696 | 9/1999 |
| WO | 0194116 | 12/2001 |

OTHER PUBLICATIONS

Hewlett-Packard Company, Product tracking and authentication for end-to-end pharmaceutical supply chain protection and efficiency (4AA0-0364ENW, Apr. 2005).

Packworld.com, Schering-Plough hits quality goal with Nutec/Wolke system, Apr. 2005.

* cited by examiner

Primary Examiner—J. A. Lorengo
Assistant Examiner—Veronica Faison Gee

(57) ABSTRACT

The present invention is directed to ink compositions and printed substrates produced using the ink, inkjet dispensers including the ink, printing systems for using and printing with the ink, and methods for using the same. In an embodiment, the ink composition is a consumable inkjet ink formulated by combining an aqueous inkjet vehicle having at least one water soluble organic solvent, and a colorant.

15 Claims, 4 Drawing Sheets

CONSUMABLE INKS WITH IMPROVED IMAGE PERFORMANCE

FIELD OF THE INVENTION

The present invention generally relates to inkjet printing, and in particular, to inks suitable for use on consumable products.

BACKGROUND OF THE INVENTION

Consumable products such as pharmaceutical tablets, pills, and capsules usually include a number of markings. The marks, including printed information, typically include indicia such as logos, names, numbers, bar codes, dosage, that may be used to provide information such as the product, source, or the dosage. Such information is also useful in guiding the dispensing and administration of the product to patients.

Traditional methods of marking pharmaceutical products include coloring the pharmaceutical products with FDA certified colorants, altering the surface appearance of the pharmaceutical products through engravings, applying a label to the surface of the pharmaceutical products, or painting the pharmaceutical product. Examples of such methods include rotogravure, flexographic, and pad printing.

While these methods and formulations are somewhat effective in marking or otherwise distinguishing pharmaceutical product, they necessitate contact with the pharmaceutical. Any such contact with the pharmaceutical products increases the likelihood of causing physical or chemical damage to the pharmaceutical product.

It would be desirable to have methods and formulations for providing such markings, with improved image performance while minimizing the physical or chemical alteration of the pharmaceutical product.

SUMMARY OF THE INVENTION

The present invention is directed to ink compositions and printed substrates produced using the ink, inkjet dispensers including the ink, printing systems for using and printing with the ink, and methods for using the same. In an embodiment, the ink composition is a consumable inkjet ink formulated by combining an aqueous inkjet vehicle having at least one water soluble organic solvent, and a colorant.

DETAILED DESCRIPTION OF EMBODIMENTS OF THE INVENTION

The present invention is directed to ink compositions and printed substrates produced using the ink, inkjet dispensers including the ink, printing systems for using and printing with the ink, and methods for using the same. In an embodiment, the ink composition is a consumable inkjet ink formulated by combining an aqueous inkjet vehicle having at least one water soluble organic solvent, and a colorant.

Inkjet inks embodying features of the present invention, provide for marking consumable products, such as pharmaceutical products, using a non-contact printing system, such as inkjet printing. Markings made on products, according to the present invention have high print quality which is not adversely affected as a result of slight variations in size of the product. In addition, methods, according to the present invention, provide for easier selection, control, alterations, and design change as the image is stored as data and not fixed on a contact number. Inks according to the present invention are formulated to provide the desirable balance among various performance attributes, including, but not limited to, image quality (e.g., print density, print uniformity, and print edge acuity), inkjet pen and/or system performance, and materials compatibility among various components such as ink, consumable product, and pen/print system material.

As used in the present specification and the appended claim, the term "edible" or "consumable" is meant to be understood broadly as any composition that is suitable for human consumption (including compositions taken or placed intracorporeally such as dental product). Similarly, the phrase "edible ink" is meant to be understood as any ink that is suitable for human consumption and complies with applicable standards such as food, drug, and cosmetic (FD&C) regulations in the United States, Eurocontrol experimental centre (E.E.C.) standards in the European Union or other similar regulatory agencies.

As used herein, wt. % or % (w/w), represents mass of the solute (or ingredient whether liquid, solid, or gas) for every 100 parts of the mass of the final solution or mixture. By way of example, a mixture of 5% of alcohol in water, represents a mixture made by adding 5 grams of an alcohol and 95 grams of water to make up to 100 grams of total mixture of the formulation.

Figure 1:
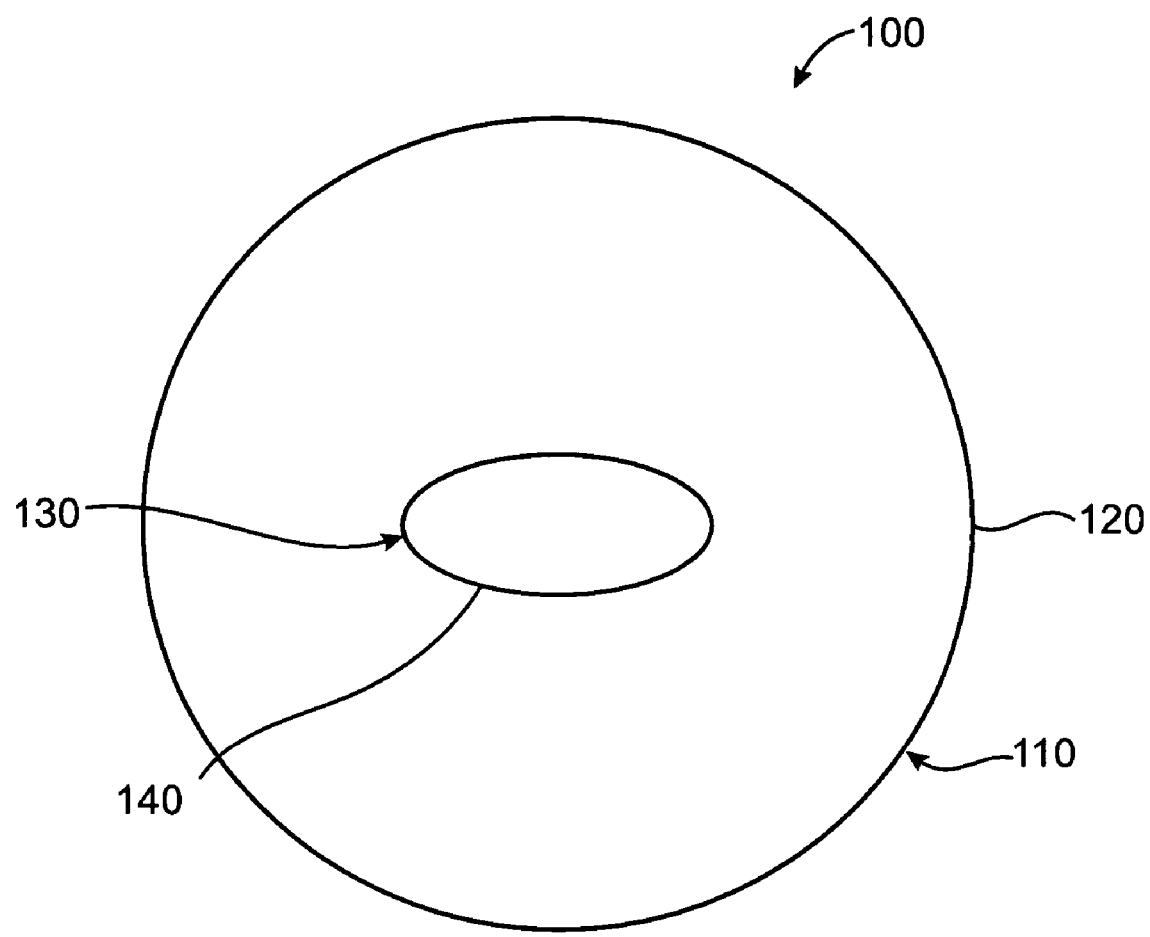
FIG. 1 is an illustration of a consumable product embodying features of the present invention.
Figure 2A:
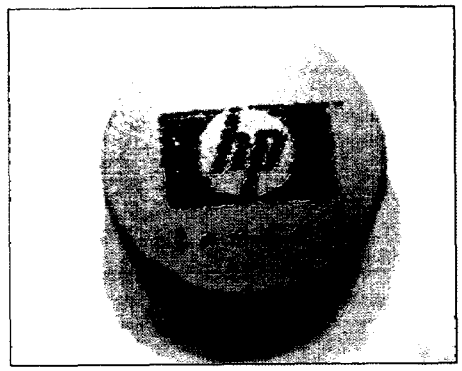
FIG. 2A through 2F are images of consumable products bearing printed indicia thereon.
Figure 2B:
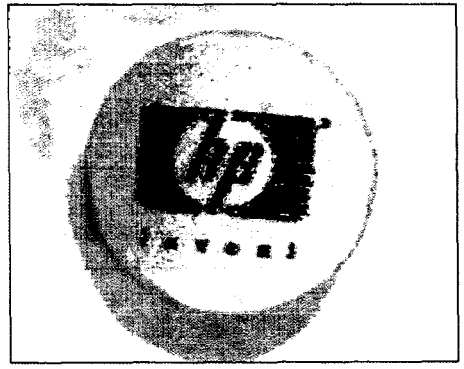
Figure 2C:
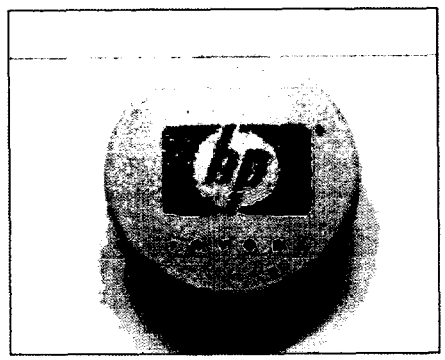
Figure 2D:
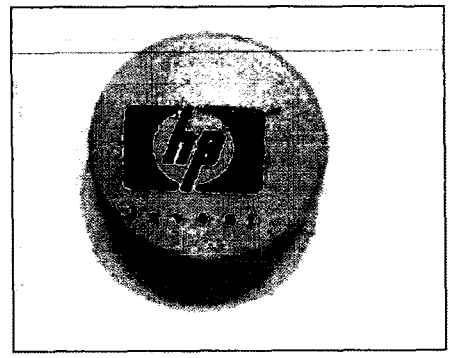
Figure 2E:
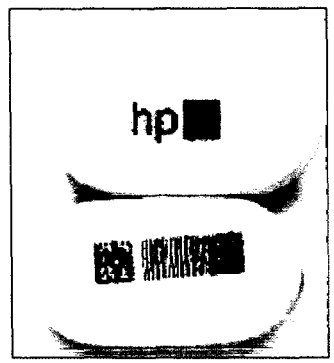
Figure 2F:
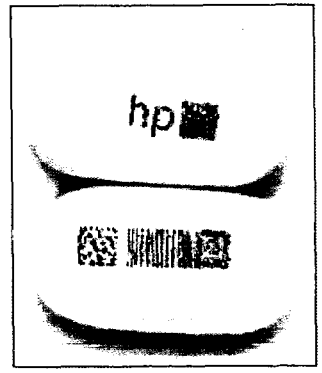

Now referring to FIG. 1, an exemplary marked consumable product 100, such as pharmaceutical product 110. As shown, in FIG. 1, the pharmaceutical product 110 includes a pill, 120 or other pharmaceutical dosage form such as a capsule, a gel capsule, a tablet, a caplet etc., having an indicia (or marking) 130, such as product name 140 printed thereon. As shown, the product name 140 or other indicia or markings, compromise the outward appearance of the pharmaceutical product 110.

Figure 3:
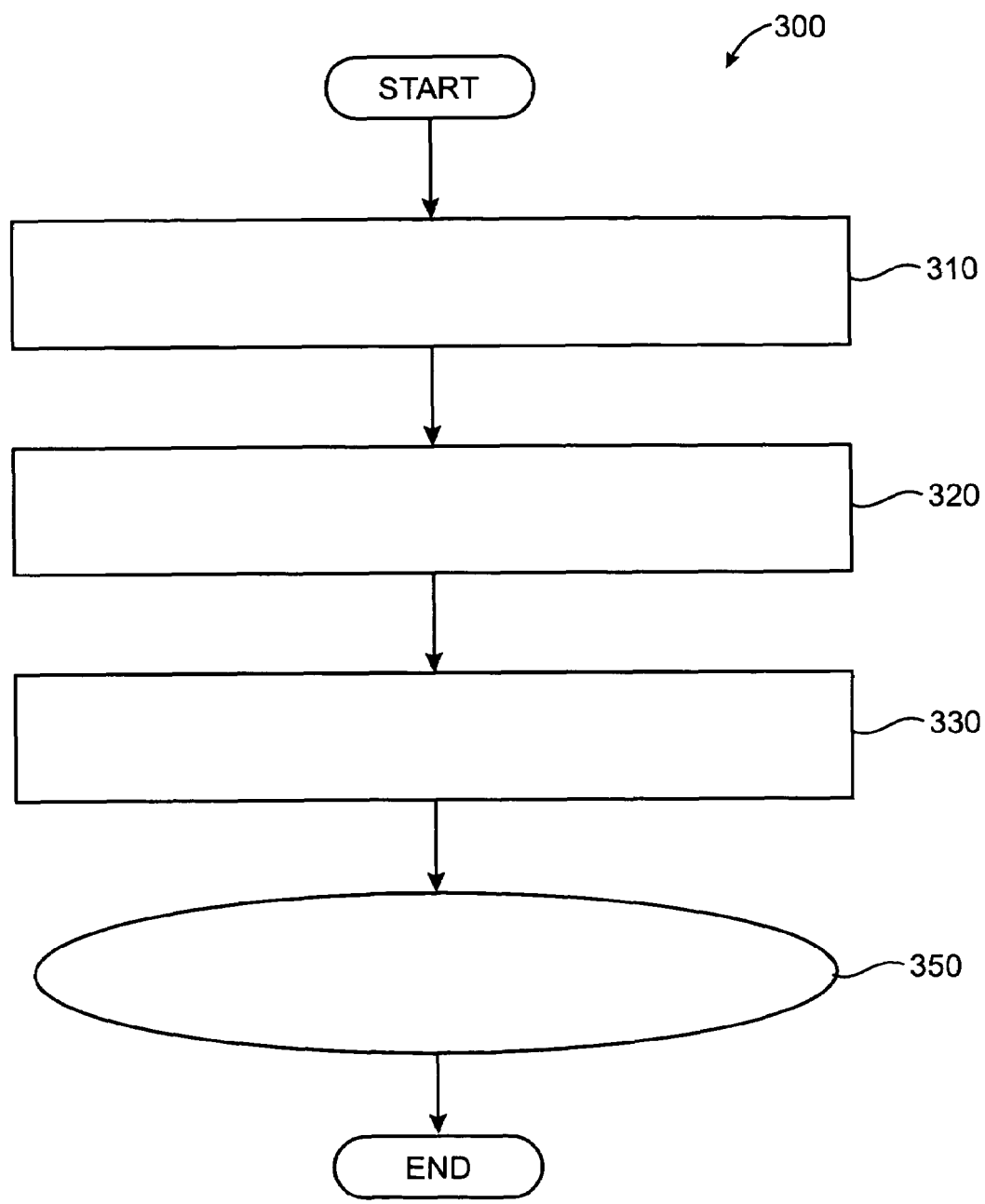
FIG. 3 is a flow chart illustrating a method for formulating a consumable ink embodying features of the present invention, according to an exemplary embodiment.

In an embodiment, indicia (or marking) 140 is produced by applying an inkjet ink formulation 350 (as shown in FIG. 3), according to the present invention, comprising an aqueous vehicle; at least one colorant; such as dyes or pigments, or a combination thereof; and at least one water-soluble organic solvent, such as methanol, ethanol, 2-propanol, n-butanol, or combinations thereof (e.g., SDA 3A, a 5:95 mixture of methanol:ethanol). Consistent with this invention, various types of additives, may be employed in the inks configured to enhance or optimize the properties of the ink compositions (or the overall printing system). Examples of such additives include surfactants, buffers, humectants, preservatives, anti-foaming agents, chelating agents (or sequestering agents), flavoring agents, and viscosity modifiers. The components of the ink may be selected from the list of compounds found in, but not limited to, the Generally Regarded as Safe ("GRAS") list sponsored by the U.S. Food and Drug Administration ("FDA").

The ink vehicle facilitates dispersion or dissolution of the colorant while enabling selectively controlled transport of the colorant from an inkjet material dispenser to the consumable product 100, such as the pharmaceutical product 110. In an embodiment, the ink vehicle may also act as a binder to affix the colorant to the consumable product 100. In an embodiment, the ink vehicle may comprise an aqueous-based ink vehicle that includes water.

According to an embodiment, the aqueous ink vehicle includes water, and at least one water-soluble organic solvent.

The selection of a suitable mixture depends on requirements of the specific application, such as desired surface tension and viscosity, the selected colorant, drying time of the ink, and the type of substrate (e.g., the pharmaceutical product composition and/or surface coating as it affects print quality of the marking 130) onto which the ink will be printed. It should be appreciated that the various ingredients may have an effect on more than one property of the consumable inkjet ink.

In the case of a mixture of water and at least one water-soluble solvent, the aqueous vehicle typically comprises from about 30% to about 98% water (as measured by weight). Generally the compositions may comprise from about 60% to about 95% water, based on the total weight of the aqueous carrier medium. The water-soluble organic solvent(s), independently, may generally be added to the ink in an amount generally ranging from about 0.01 wt % to about 80 wt % of the total weight of the inkjet ink; typically from about 0.1 to about 25 wt %, normally from about 1 to about 25 wt %.

Typically, the at least one water-soluble organic solvent, is a consumable alcohol, including, linear or branched C1-C6 alcohols, such as methanol, ethyl alcohol, 2-propanol, and n-butanol, and combinations thereof. The alcohol may affect one or more of the properties of the ink including dry time, surface tension, viscosity, as well as acting as a humectant. Other representative water-soluble organic solvents, and the exemplary amounts thereof (based on weight and calculated based on the total weight of the ink formulation) added to make up the ink, include, but are not limited to: sorbitol (typically in an amount ranging from about 2 to about 8%); propylene glycol (typically in an amount ranging from about 1 to about 20%, normally ranging from about 2 to about 10%); glycerine (typically in an amount ranging from about 3 to about 20%, normally from about 3 to about 10%); polyethylene glycol ("PEG") 200-8000, normally PEG 400; ethanol (typically in an amount ranging from about 0.5 to about 30%, normally from about 0.5 to about 20%); 2-propanol (typically in an amount ranging from about 0.5 to about 30%, normally from about 0.5 to about 20%); n-butanol (typically in an amount ranging from about 0.2 to about 20%, normally from about 0.2 to about 5%); mannitol; hexylene glycol; Specially Denatured Alcohol (SDA) 3A (e.g., 95:5 Ethanol: Methanol); water; and mixtures of thereof.

The colorant may be a dye, a pigment, or a combination of both. More than one dye or pigment may be used in the ink formulation. The colorant may be added to the ink in an amount ranging from about 0.05 to about 20%, by weight, generally, from about 0.1 to about 8%, by weight, and typically, from about 1 to about 7%, and normally from about 0.5 to about 5%, by weight, based on the total weight of the ink.

Representative colorants include, but are not limited to: isoprenoid derivatives such as carotenoids, and xanthophylls; tetrapyrrole derivatives such as chlorophylls, porphyrin, heme pigments, and bilins; benzopyran derivatives such as anthocyanins, flavones, flavonoids, tannis (e.g., catechin, theaflavin); betalain; phenalone; anthroquinone; FD&C colorants such as allura Red (FD&C Red 40), sunset yellow (FD&C Yellow 6), acid yellow 23 (FD & C Yellow 5), erioglaucine disodium salt (FD&C Blue 1), indigo carmine (FD & C Blue 2), and fast green FCF; riboflavin 5'-phosphate; erythrosine (FD&C Red 3); phloxine B; caramels; carmine 40; curcumin; annatto; eosin Y; fluorescein dyes; and combinations thereof.

A pH controlling additive may be added in amounts sufficient to maintain the pH of the formulation at the desired level. By way of example, the amount of pH controlling additive (based on weight and calculated based on the total weight of the coating formulation) added to make up the ink formulation ranges generally from about 0 to about 5.0%, typically from about 0.1 to about 1.2, normally from about 0.002 to about 0.2%. Additives for controlling the pH of the ink include, but are not limited to: sodium dihydrogen phosphate ($NaH_2PO_4$), potassium phosphate monobasic, 4-Morpholinepropanesulfonic acid; 3-(N-Morpholino)propanesulfonic acid; n-(3-sulfopropyl morpholine ("MOPS"), trishydroxymethyl aminomethane ("Tris"), ammonium acetate, acetic acid, hydrochloric acid, sulfuric acid, phosphoric acid, ammonium hydroxide, sodium hydroxide, and mixture thereof.

The amount of surfactant (based on weight and calculated based on the total weight of the ink formulation) added to make up the ink formulation range generally from about 0 to about 5.0%, typically from about 0.05 to about 0.25, normally from about 0.1 to about 0.15%. Representative additives for controlling the surface tension of the ink ("surfactant") include, but are not limited to: polysorbate 20, polysorbate 40, polysorbate 60, polysorbate 80, pluronic F-127, sodium lauryl sulfate, sorbitan monopalmitate, sorbitan monostearate, sorbitan trioleate, sorbitan tristearate, lecithin, docusate sodium, glyceryl monooleate, poloxamer (polyethylene-propylene glycol copolymer), hydrolized polyvinyl alcohol, 2-propanol, ethyl alcohol, N-butyl alcohol, and mixture thereof. It should be appreciated by those skilled in the art, that other components, such as alcohols (e.g., 2-propanol, n-butanol) may also lower the surface tension but the amounts stated above do not include the amounts of these other ingredients.

The amount of the viscosity modifier additive, (based on weight and calculated based on the total weight of the ink formulation) added to make up the ink ranges generally from about 0 to about 10.0%, typically from about 0.05 to about 1.0, normally from about 0.05 to about 0.25%. Representative additives for controlling the viscosity of the ink include, but are not limited to: sodium alginate (typically in an amount ranging from about 0.05 to about 0.25%), polyvinyl pyrrolidininone (e.g., molecular weight of about 360000 Da), propylene glycol alginate, hydroxypropylmethylcellulose (e.g., hypromellose 2910), pullulan, polyvinyl alcohol (e.g., molecular weight of about 30000 to about 70000 Da), carrageenan, gelatin, ethylcellulose, guam guar, xanthan gum, hydroxyethyl cellulose, hydroxypropyl cellulose, maltodextrin, corn syrup solids, and combinations thereof.

The amount of the antioxidant additive, (based on weight and calculated based on the total weight of the ink formulation) added to make up the ink ranges generally from about 0 to about 5.0%, typically from about 0.5 to about 4, normally from about 1 to about 3%. Representative antioxidant additives, include, but are not limited to: sodium ascorbate, sodium thiosulfate, butylated hydroxytoluene (BHT), butylated hydroxyanisole (BHA), monothioglycerol, fumaric Acid, DL-Malic Acid, and combinations thereof.

The amount of the preservative additive (e.g., biocide for controlling microbial growth), (based on weight and calculated based on the total weight of the ink formulation) added to make up the ink ranges generally from about 0 to about 5.0%, typically from about 0.1 to about 2, normally from about 0.1 to about 1%. Representative preservatives (or biocide) for controlling microbial growth in the ink and the exemplary amounts thereof, include, but are not limited to: sodium benzoate (typically an amount ranging from about 0.1 to about 0.5%), potassium sorbate (typically an amount ranging from about 0.1 to about 0.8%), methylparaben, propylparaben, ethylparaben, sodium lactate, benzyl alcohol, 2-propanol, ethyl alcohol, N-butyl alcohol, potassium metabisulfite, propionic acid, succinic acid, sodium propionate, sorbic acid, and combinations thereof.

The amount of the antifoaming additive, (based on weight and calculated based on the total weight of the ink formulation) added to make up the ink ranges generally from about 0 to about 5.0%, typically from about 0.05 to about 0.1, normally from about 0.001 to about 0.01%. Representative antifoaming additives, and the exemplary amounts thereof, based by weight, based on the total weight of the ink, added to make up the inkjet ink, include, but are not limited to: simethicone (typically at 0.001%), dimethicone (typically at 0001%), N-Butyl alcohol, ethanol, isopropyl alcohol, oleyl alcohol, and combinations thereof. It should be appreciated by those skilled in the art, that other components, such as alcohols (e.g., 2-propanol, n-butanol) may also affect as anti-foaming agents but that the amounts stated above do not include the amounts of these other ingredients.

The amount of the chelating (or sequestering) agent additive, (based on weight and calculated based on the total weight of the ink formulation) added to make up the ink ranges generally from about 0 to about 5.0%, typically from about 0.1 to about 2, normally from about 0.15 to about 0.2%. Representative chelating agent additives, include, but are not limited to: EDTA disodium, potassium citrate, DL-tartaric acid, calcium gluconate, and combinations thereof.

The amount of the flavoring (or flavor enhancing) agent additive, (based on weight and calculated based on the total weight of the ink formulation) added to make up the ink ranges generally from about 0 to about 5.0%, typically from about 0.1 to about 4, normally from about 0.1 to about 3%. Representative flavor enhancing additives, include, but are not limited to: trans-anethole, benzaldehyde, N-butyl alcohol, N-butylamine, ethyl maltol, D-fructose, maltol, vanillin, and combinations thereof.

Exemplary composition, methods of making, and using embodying features of the present invention are described below.

EXAMPLES

Inks were formulated and different performance attributes of the formulated inks were observed or measured in an effort to assess the benefits attained in the practice of the invention, such as, print quality while balancing such performance with the inks performance as it affects inkjet pen/print system performance. The inkjet ink may have been cyan, magenta, yellow, or black (including composite black obtained by mixing of colorants) depending on the colorant that was used. Each ink may have included one or more colorant at independently selectable concentrations, hues, values, and chromas. Composite black images may also be created by printing inks having different colors on the same printed location to generate a printed marking or indicia having the appearance of a black image.

The summary of composition of the inks made is represented in Tables I through IV. Although, the exemplary inks included colorants of different hue, generating a composite black image, the present invention, as indicated, may have one or more colorants of any color.

TABLE I

| Ingredients | Amount added to make the wt. % |
|---|---|
| Polysorbate 80 | 0.1 |
| Sodium Alginate | 0.05 |
| Propylene Glycol | 8 |
| Tris-HCl Aqueous Buffer[1] | 91.55 |
| Sodium Benzoate | 0.1 |
| Potassium Sorbate | 0.2 |
| FD & C Yellow 5 | 0.12 |
| FD & C Blue 1 | 0.8 |
| FD & C Red 40 | 1.6 |

Note[1]: By way of example, to prepare 16 Kg of Trizma:HCl Buffer, 48 grams of Trizma base was dissolved in water to obtain a final mass of 4000 g. About 26 grams of HCl 12 M was added to 3174 grams of deionized water. The final buffer system was obtained by mixing 4000 grams of Trizma 0.1 M, 3200 grams of HCl 0.1 M, with water added to a final mass of 16000 grams. By way of example, to prepare 20 kg of ink vehicle, 15360 grams of the buffer system was used. This typically provided an ink formulation having 0.002% TRIZMA by weight.

Note[1]: By way of example, to prepare 16 Kg of Trizma:HCl Buffer, 48 grams of Trizma base was dissolved in water to obtain a final mass of 4000 g. About 26 grams of HCl 12 M was added to 3174 grams of deionized water. The final buffer system was obtained by mixing 4000 grams of Trizma 0.1 M, 3200 grams of HCl 0.1 M, with water added to a final mass of 16000 grams. By way of example, to prepare 20 kg of ink vehicle, 15360 grams of the buffer system was used. This typically provided an ink formulation having 0.002% TRIZMA by weight.

TABLE II

| Ingredients | Amount added to make the wt. % |
|---|---|
| Polysorbate 80 | 0.2 |
| 2-propanol | 17 |
| Propylene Glycol | 3 |
| Tris-HCl aqueous Buffer | 79.8 |
| FD & C Yellow 5 | 0.12 |
| FD & C Blue 1 | 0.8 |
| FD & C Red 40 | 1.6 |

TABLE III

| Ingredients | Amount added to make the wt. % |
|---|---|
| Polysorbate 80 | 0.2 |
| 2-propanol | 17 |
| Propylene Glycol | 3 |
| Tris-HCl Buffer | 79.8 |
| FD & C Yellow 5 | 0.12 |
| FD & C Blue 1 | 0.80 |
| FD & C Red 40 | 1.60 |

TABLE IV

| Ingredients | Amount added to make the wt. % |
|---|---|
| Polysorbate 80 | 0.2 |
| 2-propanol | 17 |
| n-butanol | 3 |
| Propylene Glycol | 3 |
| Tris-HCl Buffer | 76.8 |
| FD & C Yellow 5 | 0.12 |
| FD & C Blue 1 | 0.80 |
| FD & C Red 40 | 1.60 |

The inks were printed on either or both uncoated and wax polished coated pharmaceutical tablets using an inkjet printer, with FIGS. 2A through 2D and FIGS. 2E and 2F, being representative of uncoated and "waxed" coated tablets, respectively, bearing marking or indicia created using the formulated inks shown in Tables I through IV. The samples were evaluated using either or both human observation and machine readable techniques. In general, the pen and/or print system performance for the inks made according to the present invention provided was acceptable, with formulation shown in Table IV, yielding the higher print quality.

In a series of experiments, the pharmaceutical products were first coated with a coating formulation embodying features of an invention as disclosed in U.S. patent application Ser. No. 11/297,234, entitled "Methods and Compositions for Improved Image Quality," filed concurrently herewith, and assigned to the same assignee as that of the present invention. The coating formulation comprises an aqueous vehicle comprising at least one consumable water-soluble organic solvent; and at least one consumable polymer. In an embodiment the consumable polymer comprises at least one polymer selected from the group consisting of cellulose ethers.

Ink compositions embodying features of the present invention may be made, by way of example, by combining a solvent, additives, and the colorant. Preferably, the vehicle and other additives are first combined forming a solution followed by addition of the colorant. As shown, in FIG. 3, the ink 350 is made according to an exemplary process, by first, forming an ink vehicle including water and a water-soluble organic solvent (step 310). Once the ink vehicle is formed, other additives may be added to the vehicle (step 320). The vehicle and other additives are mixed and the colorant is added (step 330), resulting in ink 350. It should be appreciated that present order of the steps may be changed (e.g., additives added before addition of the colorant) to suit the process (e.g., equipment) and the ingredients of the ink composition.

Figure 4:
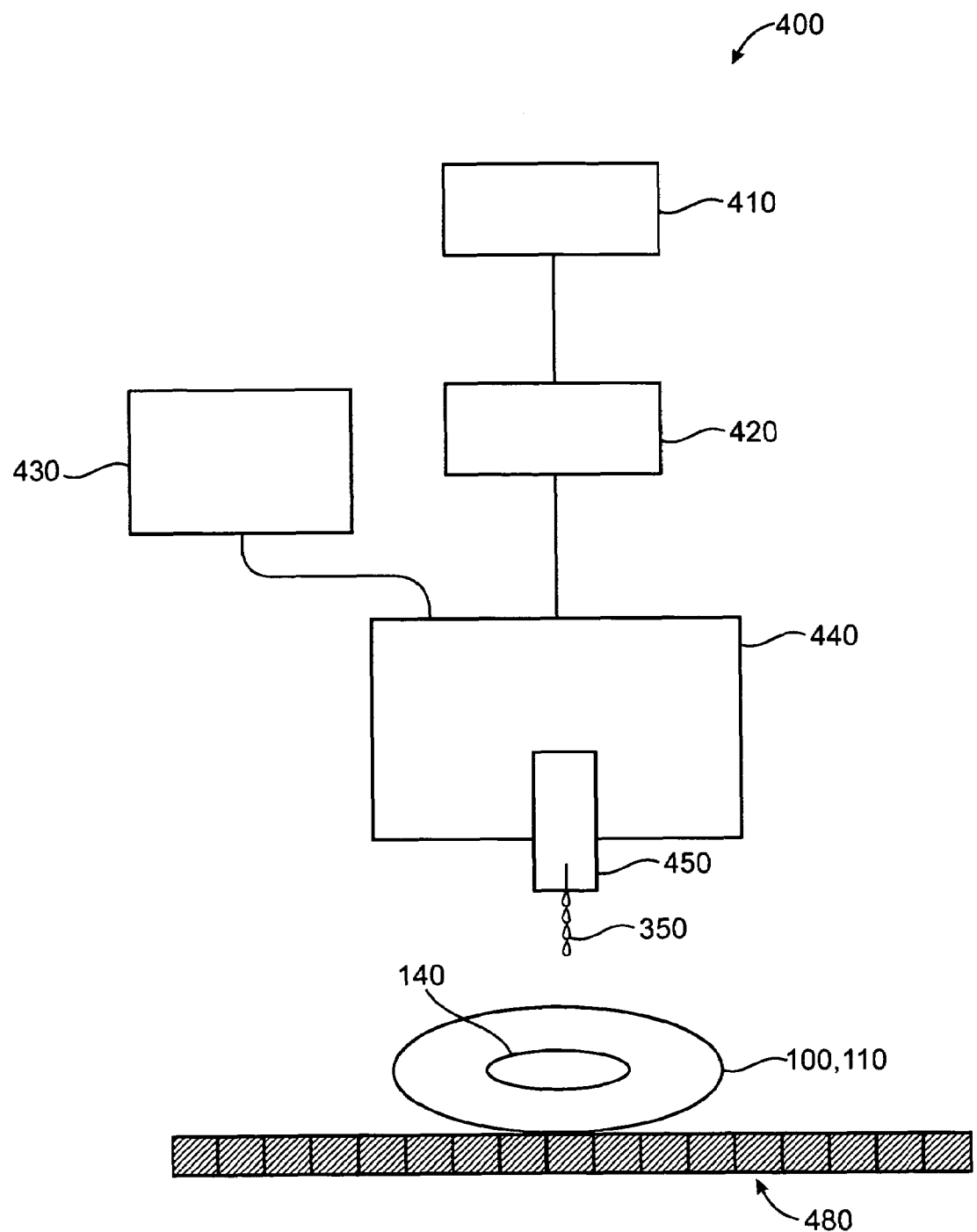
FIG. 4 is a flow chart illustrating a method for forming a marking on a consumable product, according to an exemplary embodiment

FIG. 4, illustrates an exemplary system 400 usable in creating markings or indicia 140, on the consumable product 100 such as pharmaceutical product 110, using ink compositions 350 embodying features of the present invention.

As shown in FIG. 4, the present system 400 includes a computing device 410 controllably coupled through a servo mechanism 420 to a moveable carriage 440 having an ink-jet dispenser 450 (e.g., printhead) disposed thereon. A material reservoir 430 is also coupled to the moveable carriage 440, and consequently to the inkjet dispenser 450. A support surface 480 is located adjacent to the inkjet dispenser 450 having a pharmaceutical product 110 disposed thereon. While the present embodiment is described in the context of marking a pharmaceutical product 110 with an edible, ink 350, the present system and method may be used to mark any number of items, such as consumable products 100, with the present consumable or edible, ink 350 including, but in no way limited to, food products, dental products, etc.

The computing device 410 controls the selective deposition of the ink 350 on the pharmaceutical product 110. A representation of a desired image or label may be formed using a program hosted by the computing device 410. That representation may then be converted into servo instructions that are then housed in a processor readable medium (not shown). When accessed by the computing device 410, the instructions housed in the processor readable medium may be used to control the servo mechanisms 420 as well as the movable carriage 440 and ink-jet dispenser 450. The computing device 410 illustrated in FIG. 3 may be, but is not limited to, a workstation, a personal computer, a laptop, a personal digital assistant ("PDA"), or any other processor containing device.

The moveable carriage 440, as shown, is a moveable material dispenser that may include any number of inkjet material dispensers 450 configured to dispense the present edible, ink 350. The moveable carriage 440 may be controlled by the computing device 410 and may be controllably moved by, for example, a shaft system, a belt system, a chain system, etc. making up the servo mechanism 420. As the moveable carriage 440 operates, the computing device 410 may inform a user of operating conditions as well as provide the user with a user interface.

As the image or indicia 140 is printed on the pharmaceutical product 110, the computing device 410 may controllably position the moveable carriage 440 and direct one or more of the inkjet dispensers 450 to selectively dispense the ink 350 at predetermined locations on the pharmaceutical product 110 as digitally addressed drops, thereby forming the desired image. The inkjet material dispensers 450 may be any type of inkjet dispenser configured to perform the present method including, but in no way limited to, thermally actuated inkjet dispensers, mechanically actuated inkjet dispensers, electrostatically actuated ink-jet dispensers, magnetically actuated dispensers, piezoelectrically actuated dispensers, continuous inkjet dispensers, etc. Additionally, the ink-jet material dispenser 450 can be heated to assist in dispensing the ink 350.

The material reservoir 430, fluidly coupled to the ink-jet material dispenser 450, houses the ink 350 prior to printing. The material reservoir 430 may be any sterilizeable container configured to hermetically seal the ink 350 prior to printing and may be constructed of any number of materials including, but in no way limited to metals, plastics, composites, or ceramics.

As shown, support surface 480 may transport and/or positionally secure a pharmaceutical product 110 during the printing operation.

While particular forms of the invention have been illustrated and described herein, it will be apparent that various modifications and improvements can be made to the invention. Moreover, individual features of embodiments of the invention may be shown in some drawings and not in others, but those skilled in the art will recognize that individual features of one embodiment of the invention can be combined with any or all the features of another embodiment. Accordingly, it is not intended that the invention be limited to the specific embodiments illustrated. It is intended that this invention to be defined by the scope of the appended claims as broadly as the prior art will permit.

What is claimed is:

1. A consumable thermal inkjet ink, consisting essentially of:
   a. an aqueous inkjet vehicle comprising at least one water-soluble organic solvent;
   b. a colorant dye dissolved in the vehicle;
   c. a surfactant; and
   d. a buffer;
   wherein the at least one organic solvent comprises at least one alcohol and at least one of propylene glycol and a combination of polyethylene glycol and propylene glycol.

2. The consumable thermal inkjet ink according to claim 1, wherein the at least one alcohol is selected from the group consisting of C1 through C6 alcohols, and combinations thereof.

3. The consumable thermal inkjet ink according to claim 1, wherein the at least one alcohol is selected from the group consisting of methanol, ethanol, 2-propanol, n-butanol, and combinations thereof.

4. The consumable thermal inkjet ink according to claim 1, wherein the polyethylene glycol is polyethylene glycol 400.

5. The consumable thermal inkjet ink according to any one of claims 1, 2, 3 and 4, wherein the at least one alcohol comprises at least two alcohols.

6. The consumable thermal inkjet ink according to claim 5, wherein the at least two alcohols are selected from group consisting of 2-propanol, n-butanol, and combinations thereof.

7. The consumable thermal inkjet ink according to claim 1, wherein the at least one surfactant is selected from the group consisting of polysorbate 20, polysorbate 40, polysorbate 60, polysorbate 80, pluronic F-127, sodium lauryl sulfate, sorbitan monopalmitate, sorbitan monostearate, sorbitan trioleate, sorbitan tristearate, lecithin, docusate sodium, glyceryl monooleate, poloxamer (polyethylene-propylene glycol copolymer), hydrolyzed polyvinyl alcohol, and mixtures thereof.

8. The consumable thermal inkjet ink according to claim 1, wherein the surfactant is added in an amount ranging from about 0.05 to about 0.25 wt. % based on the total weight of the ink.

9. The consumable thermal inkjet ink according to claim 6, wherein the 2-propanol and n-butanol, are independently, added in an amount ranging from about 0.5 to about 20 wt. % and from about 0.2 to about 5.0 wt. %, respectively, based on the total weight of the ink.

10. The consumable thermal inkjet ink according to claim 5, wherein the at least one organic solvent further comprises propylene glycol added in an amount ranging from about 2 to about 10 wt. % based on the total weight of the ink.

11. A pharmaceutical dosage form having either or both of an image and an indicia printed thereon, wherein either or both of the image and the indicia include at least a portion of the consumable thermal inkjet ink of claim 1.

12. A thermal inkjet printing system, comprising:
 a. a consumable thermal inkjet ink consisting essentially of:
  i. an aqueous inkjet vehicle comprising at least one water-soluble organic solvent;
  ii. a colorant dye dissolved in the vehicle;
  iii. a surfactant; and
  iv. a buffer; and
 b. a thermal inkjet dispenser configured to dispense the ink wherein the at least one organic solvent comprises at least one alcohol and at least one of propylene glycol and a combination of propylene glycol and polyethylene glycol.

13. The thermal inkjet printing system according to claim 12, further comprising a support structure having a support surface configured to hold a pharmaceutical dosage form.

14. The thermal inkjet printing system according to claim 13, further comprising a moveable carriage having the thermal inkjet dispenser disposed thereon, wherein movement of the thermal inkjet dispenser is utilized to form either or both an image and indicia on a pharmaceutical dosage form.

15. A method of making a consumable thermal inkjet ink, consisting essentially of:
 a. providing an aqueous inkjet vehicle comprising at least one water-soluble organic solvent, wherein the at least one organic solvent comprises at least one alcohol and at least one of propylene glycol and a combination of propylene glycol and polyethylene glycol;
 b. providing a colorant dye, a surfactant and a buffer; and
 c. mixing the vehicle, the surfactant, buffer and colorant dye so that the colorant dye dissolves in the vehicle.

* * * * *